July 16, 1940.　　　　　J. W. MYERS　　　　　2,207,870
COMBINED THERMOSTATIC AND TIME-CONTROLLED FLASHER MECHANISM
FOR ELECTRIC RANGE UNITS AND THE LIKE
Filed April 14, 1938　　　2 Sheets-Sheet 2
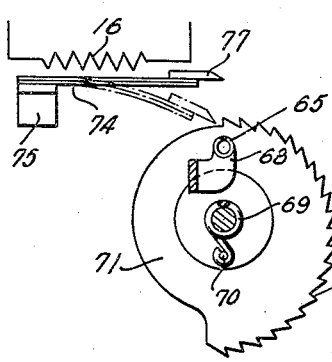
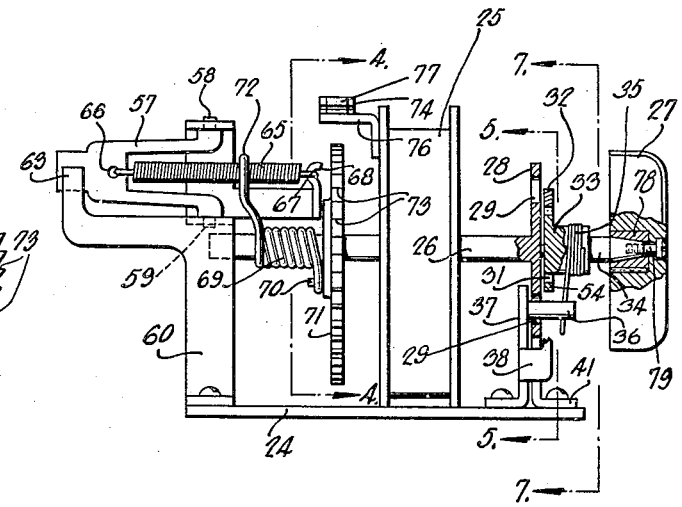
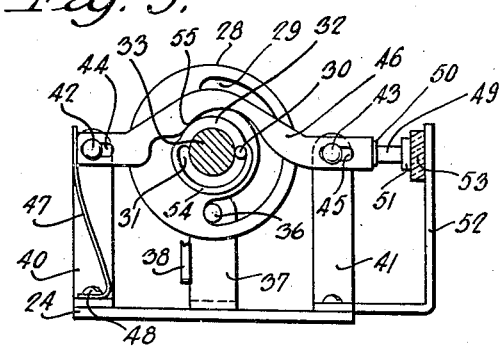
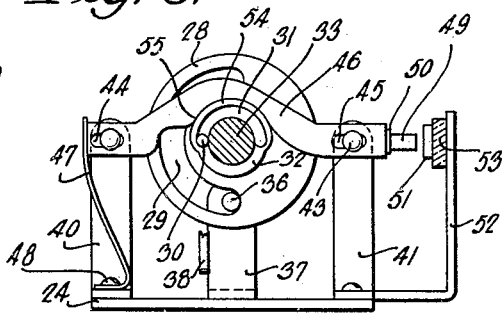
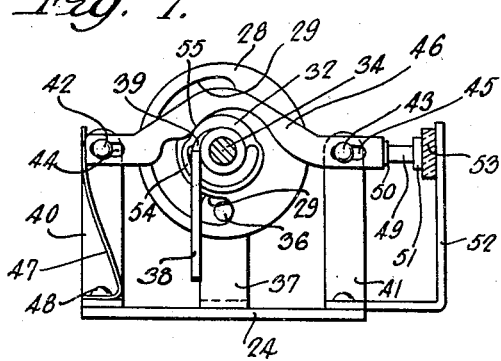
Inventor
Joseph W. Myers
By his Attorneys
Howson & Howson Patented July 16, 1940

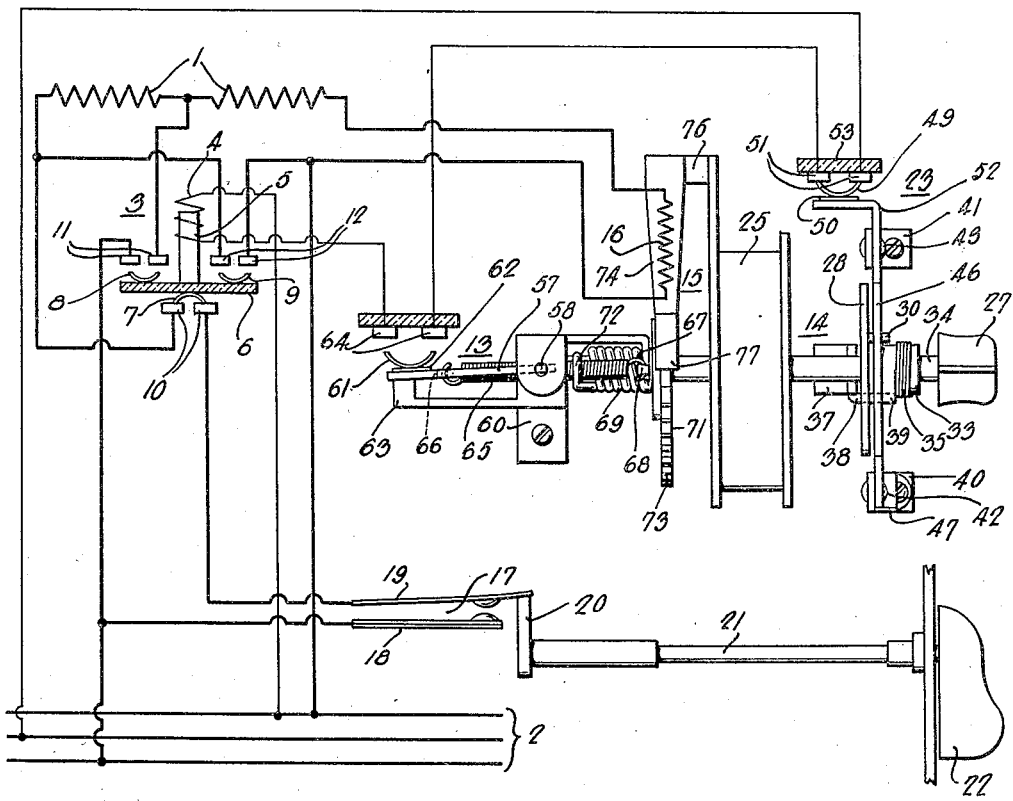

2,207,870

UNITED STATES PATENT OFFICE 2,207,870

COMBINED THERMOSTATIC AND TIME-CONTROLLED FLASHER MECHANISM FOR ELECTRIC RANGE UNITS AND THE LIKE

Joseph W. Myers, Philadelphia, Pa., assignor to Proctor & Schwartz, Incorporated, Philadelphia, Pa., a corporation of Pennsylvania Application April 14, 1938, Serial No. 202,092

22 Claims. (Cl. 219—20)

This invention relates to electric range cooking units and the like, and more particularly to novel control means for effecting rapid heating of such units to a desired temperature level and for imparting to such units a high degree of flexibility of control and operation.

The use of electric ranges and other electrical devices employing surface cooking units or plates has been limited or retarded in the past by the fact that such devices require appreciable time to attain their normal operating temperature and heat output at whatever level has been selected and in this respect are not comparable in operation to gas ranges. It is well known that electric ranges have certain definite advantages over gas ranges, but such advantages have heretofore been generally outweighed by the inherent inability of electric range units to rise rapidly to the several selectable operating temperatures. Moreover, electrical devices of this type which heretofore have been proposed or used have not had the high degree of flexibility of operation that obtains in the gas range, and this is a further reason why gas ranges have been frequently employed in the past in preference to electric ranges.

It has been proposed heretofore to temporarily overload or increase the energization of an electrical surface cooking plate unit by temporarily lowering the resistance of the unit to the supply voltage, and it has been proposed to employ a thermostat directly associated with the plate so as to be effected by the temperature thereof and arranged to restore the resistance of the heating unit to its normal value when the device has arrived at its normal operating temperature. It has also been proposed to decrease the resistance of the heating unit either by providing a normally short-circuited portion of the unit which is rendered effective by the thermostat when the unit has reached its normal operating temperature, or by providing a multi-section heating unit and initially connecting the sections in parallel relation and arranging the thermostat to connect them in series relation when the unit has reached its normal operating temperature. While these proposals have been improvements over the ordinary range unit, they have fallen short of providing a practical and commercially satisfactory range unit or surface cooking plate.

Experimentation has shown clearly that it is difficult in practice to locate a sufficiently sensitive and rugged thermostat against the lower side of the heating unit and, at the same time, have it accessible for servicing and inspection and properly protected from inevitable spillage of food substances. Moreover, to be entirely satisfactory, an electrical range unit or surface cooking plate must have multiple heats for various levels of energy output, and it should be possible to bring the heating unit rapidly to a selected operating temperature and heat output not only from the cold condition, but also from any of the lower operating levels.

The principal object of the present invention is to provide a novel control mechanism for effecting rapid heating of an electric range unit by over-energizing the unit temporarily under control of a timing mechanism. The rapid heating of the unit may be aptly termed "flashing" of the unit to the desired temperature. The timing mechanism controls the period of the flashing operation.

Another object of the invention is to provide a novel control mechanism for this purpose which embodies a timing device and a thermostatic device cooperatively arranged therewith to control the flashing operation.

A further object of the invention is to provide a novel mechanism of this character wherein the thermostatic device controls the operation of the timing device in substantial accordance with the temperature condition of the heating unit in any instance, so that the period of flashing is governed accordingly and the temperature of the heating unit is prevented from rising above the normal high temperature level thereof.

Other objects and features of the invention will appear hereinafter.

In the accompanying drawings:

Fig. 1 is a diagrammatic illustration of the electrical control system showing the timing device in plan view;

Fig. 2 is a face view of the control panel of the mechanism;

Fig. 3 is a side elevational view of the timing device and associated parts;

Fig. 4 is a detail sectional view taken along line 4—4 of Fig. 3;

Fig. 5 is a sectional view taken along line 5—5 of Fig. 3, showing the parts in normal rest position;

Fig. 6 is a similar view showing the parts in different position; and

Fig. 7 is a sectional view taken along line 7—7 of Fig. 3, showing another condition of the parts.

Referring to Fig. 1, there is shown a heating unit 1 comprising a plurality of sections, two sections being employed in the specific device illustrated. The heating unit is energized from a three-wire supply line 2 which supplies different operating voltages, as will be well understood; for example, the voltages across two adjacent conductors of the supply line may be 115 volts, while the voltage across the two outer conductors may be 230 volts. A switching device or contactor 3 is adapted to change the connections of the heating unit sections from normal series relation to parallel relation in order to increase the energization of the heating unit or, in other words, to flash the heating unit as above mentioned. While it is preferred to employ a multi-section heating unit and to flash the unit by varying the connection of the sections, any suitable type of heating unit may be used and the flashing thereof may be effected by increasing the energization of the unit in any desired manner. In the specific illustration, the contactor 3 is electro-magnetically operated and comprises an energizing winding 4 and an associated armature 5 having a magnetic core associated with the winding. The cross-bar 6 of the armature may be formed of insulating material and carries a lower contact bridge 7 and upper contact bridges 8 and 9. The contact bridge 7 is adapted to engage stationary contacts 10, while the contact bridges 8 and 9 are adapted to engage stationary contacts 11 and 12, respectively.

The flashing of the heating unit by means of the contactor 3 is controlled by a switch 13 which, in turn, is controlled by a timing mechanism 14, as will be described presently. As mentioned above, the operation of the timing device is governed by a thermostatic device 15 which includes a heater element 16. This device will be described in detail later.

In order to control the normal operation of the heating unit 1, there is provided a thermostatic switch 17 which may comprise a bimetallic strip 18 and a cooperating resilient contact arm 19, whose position is adjustable by means of a cam 20 for operation at different temperature levels. The cam 20 is carried upon a rotatable shaft 21 which is controllable by means of the operating knob 22. While switch 17 may take any suitable form, it is preferably of the form disclosed and claimed in the copending Myers and Roesch application, Serial No. 54,341, filed December 13, 1935, wherein the thermostatic element is arranged in thermal conducting relation with the bottom of a cooking vessel so as to respond to the temperature of the vessel and its food contents.

From the description thus far, it will be seen that when the switch 17 is closed and is adjusted for a desired temperature level of the heating unit, the heating unit sections are connected in series across the high voltage conductors of the supply line through a circuit which may be traced from the lowermost supply conductor through the switch 17, closed contacts 10, the heating unit sections in series, and heater 16 to the uppermost supply conductor. When the contactor 3 is energized, however, its contacts 10 are opened, while its contacts 11 and 12 are closed, and the heating unit sections are then connected in parallel relation across the high voltage supply conductors through a circuit which may be traced as follows:— From the lowermost supply conductor through the closed contacts 11 and thence through two parallel branch circuits to the uppermost supply conductor, one of the branch circuits including the left-hand heating unit section and closed contacts 12, while the other branch circuit includes the right-hand heating unit section and the heater 16. It will be noted that the switch 17 is excluded from the circuit during the flashing operation, that is when the heating unit sections are connected in parallel relation, so that this switch is effective to control the heating unit only during normal operation and is not effective to control the flashing operation. Therefore, the switch 17 is incapable of interrupting the flashing operation.

The energizing circuit for contactor 3 is connected across the two upper supply conductors so that a relatively low voltage is applied to this circuit. This energizing circuit includes, in addition to the contactor winding 4, the switch 13 and switch 23, of which more will be said later.

Referring now to the timing device 14, the details of which are shown in Figs. 3 to 7, this device comprises a supporting base 24 on which the various parts are conveniently mounted. A timing mechanism 25 is mounted on the base and this mechanism preferably takes the form of a conventional spring-operated motor having a rotatable shaft 26. Energy may be stored in the operating spring of the device by rotating the shaft 26 in a given direction and, when the shaft is released after being thus rotated, the spring motor functions through an escapement mechanism to rotate the shaft 26 in the opposite direction at a relatively slow uniform rate. Since the spring motor is conventional, there is no need to illustrate or describe it in detail. In the present instance, the shaft 26 is manually rotatable to initiate operation of the timing device by means of a manual control knob 27.

On one end of the shaft 26, there is provided a disk 28 having a slot 29 therein, the purpose of which will be explained presently. The disk 28 also carries a pin 30 which rides in slot 31 of a cam 32 disposed adjacent to disk 28 but having no connection therewith other than the pin and slot connection. The cam 32 has a hub 33 by means of which it is mounted on a short shaft or stud 34 which also carries the operating knob 27. A spring 35 is arranged to normally maintain the stud 34 and knob 27 in normal rest position and, to this end, the spring is wound about the hub 33 and has one end anchored thereto while the opposite end of the spring engages the stop 36 carried by a bracket 37 which, in turn, is mounted upon the base 24. As may be seen more clearly in Figs. 5 to 7, the stop 36 is in the form of a pin which extends through and rides in the slot 29 of disk 28. As shown more clearly in Fig. 7, the bracket 37 also carries an arm 38, the upper end of which serves as a stop which is engageable by a stop element 39 formed on the hub 33 to limit the counter-clockwise rotation of stud 34, as viewed in Fig. 7. These cooperative stop elements determine or fix the normal rest position of the stud 34 and the operating knob 27. The spring 35 is arranged to resist clockwise rotation of stud 34 so that when the stud is rotated by means of knob 27 in a clockwise direction, as viewed in Fig. 7, and when the knob is released, the spring 35 actuates the stud 34 counter-clockwise until the stop element 39 abuts the stop 38.

As shown in Figs. 5 to 7, a pair of spaced brackets 40 and 41 are carried by the supporting base and, at their upper ends, these brackets carry pins 42 and 43 which ride in slots 44 and 45, respectively, of a yoke 46. It will be seen, therefore, that the yoke 46 is shiftable laterally of the device for a purpose which will be described presently. A leaf-spring 47 has its lower end anchored at 48, while the upper free end of the spring engages the left-hand end of yoke 46, as viewed in Figs. 5 to 7, so that the spring urges the yoke toward the right, as viewed in these figures. On the right-hand end of the yoke, there is mounted a contact bridge 49 which is insulated from the yoke by means of an insulating disk 50. The contact bridge 49 normally engages stationary contacts 51 which are carried by a bracket 52 and insulated therefrom by means of an insulating block or disk 53. The contacts 49 and 51 comprise the elements of switch 23 which, as shown in Fig. 1, is included in the energizing circuit of the contactor 3.

The cam 32 and the yoke 46 are formed to provide cooperating cam portions 54 and 55 by means of which the yoke 46 is shifted toward the left when the knob 27 is turned to rotate the cam 32 clockwise. In Fig. 5, the parts are shown in their normal rest position with the switch 23 closed, while in Fig. 6 the parts are shown with the cam rotated through 180° with the yoke 46 shifted to its left-hand position so that the switch 23 is open.

From the description thus far, it will be seen that, when the knob 27 is rotated to wind the spring of the motor 25, the rotation of cam 32 from the position of Fig. 5 to the position of Fig. 6 actuates the yoke 46 to open switch 23, as above described and, at the same time, the cam 32 moves the pin 30, thus rotating disk 28 clockwise until the rotation is interrupted by the pin 36 reaching the opposite end of slot 29, as shown in Fig. 6. The consequent rotation of shaft 26 winds the motor spring, as above mentioned. When the knob 27 is released, the spring 35 moves stud 34 and the elements carried thereby back to normal position so that the yoke 46 is permitted to return to its right-hand position, thus closing the switch 23, as shown in Fig. 7. The operation of the spring motor rotates the shaft 26 counter-clockwise at a relatively slow rate, and the consequent rotation of disk 28 causes pin 36 to ride in slot 29 from the position of Fig. 7 back to the position of Fig. 5.

Thus, it will be seen that during the turning of knob 27 to wind the motor spring, the switch 23 is opened so that energization of contactor 3 is prevented, but when the knob 27 is released and the timing mechanism or spring motor starts to operate, the switch 23 is closed to permit energization of the contactor 3. In other words, the switch 23 is closed simultaneously with the commencement of the operation of the timing mechanism. This switch prevents flashing of the heating unit by holding the knob 27 in actuated position, as will be more clearly understood later.

The motor spring may be wound to different degrees by rotating knob 27 different angular amounts so that the period of operation of the timing device may be varied to flash the heating unit to different temperature levels. As shown in Fig. 2, there is preferably provided a common control panel 56 and, on this panel, there are provided suitable legens such as those illustrated. It will be seen that the principal temperature levels to which it may be desired to flash the heating unit are indicated adjacent the control knob 27 and, by rotating the knob 27 accordingly, the timing mechanism may be operated to flash the heating unit for a period calculated to raise the temperature level of the heating unit to that indicated on the control panel.

The switch 13 controls the flashing of the heating unit under control of the timing device. This switch comprises an arm 57 having end portions 58 and 59 pivotally carried by a bracket 60 mounted on the supporting base. At its free end, the arm 57 carries a contact bridge 61 which is insulated from the arm by means of an insulating disk 62. In its switch-opening position, the arm abuts against the stop 63 formed integrally with the bracket 60. When the arm moves to its switch-closing position, the contact bridge 61 engages the stationary contacts 64. A spring 65 has one end attached to arm 57 at 66, while the other end of the spring is anchored at 67 to a lug 68 on bracket 60. The spring is so arranged with respect to the pivots 58 and 59 that it tends to maintain the switch arm 57 in either of its positions. To this end, the anchor point 67 and the pivots 58 and 59 lie substantially in a plane midway between the stop 63 and the stationary contacts 64. Normally, the spring maintains the arm 57 against the stop 63 as shown in Fig. 1, but when the arm 57 is moved to a position just beyond its center position, the spring snaps the arm to its switch-closing position and maintains it in such position until the arm is again moved in the opposite direction to just beyond its central position.

The switch arm is actuated by deflecting the spring 65 in one direction or the other. To this end, there is provided a spring-deflecting element 69 which, in the specific form illustrated, comprises a stiff spring-like member wound about the end portion of shaft 26 and having one end anchored at 70 to a ratchet wheel 71 mounted on the shaft, while the opposite end 72 of the spring 69 is formed in the shape of a U about the spring 65. It will be seen, therefore, that, when the shaft 26 rotates, the anchored end of spring 69 is rotated accordingly and causes angular movement of the U-shaped end 72 which deflects the spring 65 in either direction according to the direction of rotation. It may now be seen that, when the knob 27 is rotated clockwise to wind the clockwork, the clockwise rotation of shaft 26 causes the spring 65 to be deflected from the position of Fig. 1 to thus snap the arm 57 to switch-closing position. Thus, rotation of knob 27 effects closure of switch 13 at the same time that it conditions the timing device for operation. But switch 23 prevents the flashing operation from taking place until knob 27 is released, thus preventing flashing of the heating unit independently of the timing device. When the timing device has moved the shaft 26 counter-clockwise back to the normal position, the consequent deflection of spring 65 snaps the switch arm 57 to switch-opening position, thus deenergizing contactor 3 and interrupting the flashing operation at the end of the period of operation of the timing device.

Referring now to the device 15, as stated above, this device is adapted to control the operation of the timing device substantially in accordance with the temperature condition of the heating unit in any instance, and also prevents or prohibits the flashing mechanism from increasing the temperature of the heating unit beyond its safe high temperature level. The device 15 may be aptly termed a "thermal prohibitor" since it is a thermally-responsive device and acts as a prohibitor with respect to the functioning of the timing mechanism.

The eccentric ratchet-wheel 71, which is shown clearly in Fig. 4, is mounted upon shaft 26 for rotation therewith. It will be seen that this ratchet-wheel has successive ratchet teeth 73 extending over about one-half the periphery of the ratchet-wheel, the toothed periphery being eccentric with respect to the axis of the wheel. In other words, the radial distance from the axis of the ratchet-wheel to each of the successive teeth increases or decreases depending upon the circumferential direction considered. Adjacent the ratchet-wheel, there is mounted a thermostatic element 74 which preferably takes the form of a bi-metallic strip constructed and arranged to flex toward the ratchet-wheel in response to heat, as indicated in Fig. 4. One end of the bimetallic element is anchored at 75, for example by attachment to a bracket 76 carried by the frame or housing of the timing motor mechanism 25. At the free end, the bimetallic element or strip 74 carries a pawl-like element 77, the tapered end of which is adapted to engage the recesses of the ratchet teeth 73.

As may be clearly seen from Figs. 3 and 4, when the knob 27 is manually rotated to wind the timing mechanism, the ratchet-wheel 73 is rotated in a counter-clockwise direction, as viewed in Fig. 4. Due to the progressive arrangement of the ratchet teeth, if the bimetallic strip 74 is flexed toward the ratchet-wheel, the amount which the timing device can be wound will be determined by the instant position of the bimetallic strip. If the strip is only slightly flexed, the timing device may be wound a substantial amount before the pawl 77 engages a recess of the ratchet. If, on the other hand, the bimetallic strip is greatly flexed, the timing device may be wound only slightly since the pawl 77 will engage one of the first few recesses of the ratchet, thus locking the shaft 26 against further rotation. Thus, the amount which the timing device may be wound in any instance is determined by the position of pawl 77 at that time. During operation of the timing device, the ratchet-wheel rotates clockwise, as viewed in Fig. 4, so that the pawl 77 rides over the ratchet teeth.

To prevent straining of the bimetallic strip 74 by the operator attempting to turn shaft 26 after it has been stopped by the ratchet and pawl, there is preferably provided a friction clutch between knob 27 and stud 34. A simple form of such a clutch is shown in Fig. 3, the end of stud 34 being tapered to constitute a clutch cone and seating in a conical sleeve 78 within knob 27. The friction between these elements is adjustable by means of screw 79 and may be made sufficient to permit conditioning of the device for operation, but when the shaft 26 is stopped by the ratchet and pawl, the clutch elements will slip, thus preventing straining of strip 74, if too great a force is applied to the knob.

In order to effect flexing movement of the bimetallic strip 74 in direct relation to the temperature of the heating unit so that the thermostatic device will control the operation of the timing device substantially in accordance with the temperature condition of the heating unit, the heater 16 is provided in cooperative relation with the bimetallic strip. As noted above, this heater is in circuit with the heating unit during both normal and flashing operation of the heating unit, and the current flowing through the heater causes it to give off heat to actuate the thermostatic strip. The heater may be cooperatively arranged with the thermostatic strip in any desired manner; for example, the heater may be wound about the bimetallic strip 74 or may be mounted thereon in any other suitable fashion. In the drawings, the heater has been shown diagrammatically only.

A simple thermostatic device of this character may be readily designed or constructed so that it is governed by the energization "history" of the heating unit immediately preceding a given instant. In other words, the thermo-motive element 74 may be conditioned according to the temperature of the heating unit and may be made to substantially "track" with the temperature of the heating unit, the temperature of one being a function of that of the other but not necessarily the same temperature.

The proper design of the thermostatic device necessarily depends upon various factors, such as the mass of the heating unit with which the device is to be used, the thermal mass of the thermostatic element to be employed, and the activity of the element. In any case, the heating unit should have as low a mass as possible, so that it may be heated rapidly during the flashing operation. Generally speaking, heating units of the type employing highly compressed insulating material completely embedding the wires are satisfactory for the purposes of the invention. For example, the well known tubular "Calrod" heating unit, which is commonly employed in electric ranges, is quite satisfactory. Such unit is capable of being flashed to its normal high operating temperature level in thirty seconds.

One form of the thermostatic device which has been found to be satisfactory comprises a bimetallic strip with the heater element wound about or otherwise disposed on the strip and covered with heat-insulating material, such as sheet asbestos. A fairly heavy bimetal strip of substantial mass should preferably be employed in order that it will store the heat and will not cool too rapidly. For example, a strip of bimetal 2 inches long, ¼ inch wide and .040 inch thick has been found to be satisfactory. The heater may be formed of any suitable resistance wire, such as flat ribbon wire, insulated from the bimetal by mica or other suitable electric insulation. For example, a piece of Nichrome ribbon ⅛ inch wide, .004 thick and of sufficient length to have a resistance of about ⅓ ohm has been found to be satisfactory. Employing a 1200 watt heating unit, this heater consumes about 36 watts during flash to "high" and about 9 watts during normal high operation. A simple method of designing the device is as follows:

Given a heating unit of certain capacity, it is a simple matter to determine the time required to heat it to a certain high temperature when its sections are connected in parallel across the high voltage supply lines. For example, a 1200 watt "Calrod" unit will heat to a temperature of about 1200° F. in about thirty seconds. In such case, the timing mechanism and the associated switch 13 will, of course, be arranged to operate for this period. The thermostatic control device is then constructed, employing a sufficient length or sufficient number of turns of wire to cause the pawl 77 to engage the lowest recess of the ratchet at the termination of the thirty second flash period, during which the heating unit is being flashed from cold condition to its normal high temperature. In other words, a sufficient length of the heater 16 will be employed to cause the thermostatic element 74 to move through the range indicated in Fig. 4 during a period of about 30 seconds. It is a simple matter to vary the length of the heater to accomplish this. The heating unit is then reflashed to the same high temperature as before after partial cooling and, if the thermostatic element moves to the same position during the flashing period, it is tracking with the heating unit both during heating and cooling. If, however, it has not moved as far as the same position, the bimetallic element is cooling more rapidly than the heating unit and, to correct this, sufficient heat insulation material, such as asbestos, may be placed about the element to reduce the cooling rate of the thermostatic element and cause it to track with the heating unit. If desired, heat-reflecting material, such as aluminum foil, may be used to reduce the cooling rate of the thermostatic element; for example, several layers of asbestos papers, asbestos string, and aluminum foil may be used. Of course, too much insulation on the bimetal element will cause it to move beyond its normal "high" position when a test reflash is made, indicating that it is cooling more slowly than the heating unit.

From the foregoing description, it will be seen that the heating unit may be flashed by manual operation of the knob 27 for a period of time which is dependent upon the condition of the thermostatic element 74 at that instant which, in turn, depends principally upon the temperature condition of the heating unit. In other words, the period of flashing is governed in relation to the instant temperature condition of the heating unit. Furthermore, the thermostatic device prohibits operation of the flashing mechanism by preventing winding of the spring motor whenever the heating unit is already substantially at its normal high temperature level. Thus, the thermostatic device prohibits over-flashing of the unit whether it be accidental or intentional and, accordingly, prevents damage to the unit. Further, the switch 23 and associated operating mechanism makes it impossible to flash the heating unit by holding knob 27 in actuated position, since the contactor 3 cannot be energized until the knob is released. This prevents damage to the heating unit which might be caused were it not for switch 23.

While a specific form of the invention has been illustrated and described, it will be apparent that various modifications and other forms are possible within the scope of the invention.

I claim:

1. In electrical cooking apparatus, an electrical heating unit, means for energizing said unit, means including a normally open switch for increasing the energization of said unit to above normal, to thereby cause said unit to heat rapidly, a timing device, a rotatable shaft connected to said device and operable thereby, manually-operable means for initiating operation of said timing device, and means operable by said shaft to close said switch when operation of the timing device is initiated and to open said switch when the operation of the timing device is completed, whereby said unit is over-energized during the period of operation of the timing device.

2. In electrical cooking apparatus, an electrical heating unit, means for energizing said unit, means including a normally open spring-actuated snap switch for increasing the energization of said unit to above normal, to thereby cause said unit to heat rapidly, a timing device, a rotatable shaft connected to said device and operable thereby, manually-operable means for initiating operation of said timing device, and means on said shaft operative to deflect the spring of said switch in a direction to close the switch when operation of the timing device is initiated, and operative to deflect the spring in the opposite direction to open the switch when the operation of the timing device is completed, whereby said unit is over-energized during the period of operation of the timing device.

3. In an electrical cooking apparatus, an electrical heating unit, means for energizing said unit, means for increasing the energization of said unit to above normal, to cause said unit to heat rapidly, timing means for controlling the period of abnormal energization of said unit, manual means for conditioning said timing means for operation, and means for preventing abnormal energization of said unit until said manual means is released.

4. In an electrical cooking apparatus, an electrical heating unit, means for energizing said unit, means for increasing the energization of said unit to above normal, to cause said unit to heat rapidly, a spring-operated timing device for controlling the period of abnormal energization of said unit, manual means for winding the spring of said device to condition the device for operation, and means for preventing abnormal energization of said unit until said manual means is released.

5. In electrical cooking apparatus, an electrical heating unit, means for energizing said unit, electrically operable switching means for varying the connections of said unit to increase the energization of the unit to above normal, to thereby cause said unit to heat rapidly, an energizing circuit for said switching means, a normally open switch for controlling said circuit, a timing device, manually-operable means for conditioning said timing device for operation and simultaneously closing said switch, means for preventing energization of said switching means until manual release of said conditioning means, and means operable by said timing device to open said switch after a time interval, to thereby deenergize said switching means and restore normal energization of said unit.

6. In an electrical cooking apparatus, an electrical heating unit, means for energizing said unit, means for increasing the energization of said unit to above normal, to cause said unit to heat rapidly, timing means remote from said unit for controlling the period of abnormal energization of said unit, manually operable means for conditioning said timing means for operation, and thermal-responsive means operatively associated with said timing means for controlling the conditioning thereof according to the temperature condition of said unit, and for preventing the conditioning of the timing means when said unit is already heated substantially to its normal high temperature level, said thermal-responsive means comprising a thermo-motive element and an associated heater element arranged in circuit with said unit so as to receive at all times an amount of energy that is proportional to the energy supplied to said unit, said thermo-responsive means being constructed and arranged to heat and cool proportionately to the heating and cooling of said unit so as to track with the same.

7. In electrical cooking apparatus, an electrical heating unit, means for energizing said unit, means including a normally open switch for increasing the energization of said unit to above normal, to thereby cause said unit to heat rapidly, an operating member for said switch movable in opposite directions, means operable by said member for closing said switch when said member moves in one direction and for opening said switch when said member reaches substantially the end of its movement in the other direction, manual means for moving said member in said first-mentioned direction, and a timing device for moving said member at a relatively slow rate in the said other direction, whereby said switch is closed by the manual movement of said member thereby effecting increased energization of said unit, and said switch is opened by said member under the influence of said timing device after a predetermined time interval thereby terminating the increased energization of said unit.

8. In electrical cooking apparatus, an electrical heating unit, means for energizing said unit, means including a normally open switch for increasing the energization of said unit to above normal, to thereby cause said unit to heat rapidly, an operating member for said switch movable in opposite directions, means operable by said member for closing said switch when said member moves in one direction and for opening said switch when said member reaches substantially the end of its movement in the other direction, manual means for moving said member in said first-mentioned direction, and a spring-operated motor connected to said member and arranged so as to be wound by said member when the latter is moved manually in said first-mentioned direction and adapted to move said member at a relatively slow rate in the said other direction, whereby said switch is closed by the manual movement of said member thereby effecting increased energization of said unit, and said switch is opened by said member under the influence of said motor after a predetermined time interval thereby terminating the increased energization of said unit.

9. In electrical cooking apparatus, an electrical heating unit, means for energizing said unit, means including a normally open switch for increasing the energization of said unit to above normal, to thereby cause said unit to heat rapidly, a rotatable shaft movable in opposite directions, means attached to said shaft and operatively associated with said switch for closing the switch when said shaft rotates in one direction and for opening the switch when said shaft reaches substantially the end of its rotation in the other direction, manual means for rotating said shaft in said first-mentioned direction, and a spring-operated motor connected to said shaft and arranged so as to be wound by said shaft when the latter is rotated manually in said first-mentioned direction and adapted to rotate said shaft at a relatively slow rate in the said other direction, whereby said switch is closed by the manual rotation of said shaft thereby effecting increased energization of said unit, and said switch is opened by said shaft under the influence of said motor after a predetermined time interval thereby terminating the increased energization of said unit.

10. In an electrical cooking apparatus, an electric cooking unit, means for energizing said unit, electrically-operable means for increasing the energization of said unit to above normal, to thereby cause said unit to heat rapidly, an energizing circuit for said energy-increasing means, said circuit including a normally-open switch and a normally-closed switch serially connected therein, an operating member for said first switch movable in opposite directions, means operable by said member for closing said first switch when said member moves in one direction and for opening said first switch when said member reaches substantially the end of its movement in the other direction, manual means for moving said member in said first-mentioned direction, means responsive to actuation of said manual means for opening said second switch during the manual movement of said member, to thereby prevent energization of said circuit, and a timing device for moving said member at a relatively slow rate in the said other direction, whereby both of said switches are closed and said circuit is energized during the movement of said member by said timing device, and said first switch is opened by said member under the influence of said timing device after a predetermined time interval thereby terminating the increased energization of said unit.

11. In an electrical cooking apparatus, an electric cooking unit, means for energizing said unit, electrically-operable means for increasing the energization of said unit to above normal, to thereby cause said unit to heat rapidly, an energizing circuit for said energy-increasing means, said circuit including a normally-open switch and a normally-closed switch serially connected therein, an operating member for said first switch movable in opposite directions, means operable by said member for closing said first switch when said member moves in one direction and for opening said first switch when said member reaches substantially the end of its movement in the other direction, manual means for moving said member in said first-mentioned direction, means responsive to actuation of said manual means for opening said second switch during the manual movement of said member, to thereby prevent energization of said circuit, and a spring-operated timing device windable by said member during manual movement thereof and adapted to move said member at a relatively slow rate in the said other direction, whereby both of said switches are closed and said circuit is energized during the movement of said member by said timing device, and said first switch is opened by said member under the influence of said timing device after a predetermined time interval thereby terminating the increased energization of said unit.

12. In an electrical cooking apparatus, a multi-section electric cooking unit, means for connecting the sections of said unit in series relation to effect normal energization of the unit, means for connecting said sections in parallel relation to greatly increase the energization of said unit, whereby the wattage consumption of said unit is increased in a certain ratio, timing means for controlling the period during which said parallel connection is maintained, thermo-responsive means for controlling the operation of said timing means according to the temperature of said unit, and a heater element for said thermo-responsive means arranged in circuit with said unit so that the said element is serially connected during normal energization of said unit and is included in a parallel branch circuit with one of said sections during increased energization of the unit, whereby the wattage consumption of said element varies in the same ratio as the wattage consumption of said unit.

13. In an electrical cooking apparatus, an electric cooking unit, means for energizing said unit, manually-adjustable means for operating said unit at any one of a plurality of temperature levels, means for greatly increasing the energizing current to said unit to effect rapid heating thereof, timing means for operating said current-increasing means for a time interval, and manual means for causing said timing means to operate through any one of a plurality of time intervals of different length corresponding to different temperature levels, to thereby effect rapid heating of said unit to a selected temperature level corresponding substantially to a temperature level selected by said first-mentioned manual means.

14. In an electrical cooking apparatus, an electric cooking unit, means for energizing said unit, manually-adjustable means for operating said unit at any one of a plurality of temperature levels, means for greatly increasing the energizing current to said unit to effect rapid heating thereof, windable timing means for operating said current-increasing means for a time interval, and manual means for winding said timing means to different extents to cause said timing means to operate through any one of a plurality of time intervals of different length corresponding to different temperature levels, to thereby effect rapid heating of said unit to a selected temperature level corresponding substantially to a temperature level selected by said first-mentioned manual means.

15. In an electrical cooking apparatus, an electric cooking unit, means for energizing said unit, manually-adjustable means for operating said unit at any one of a plurality of temperature levels, means for greatly increasing the energizing current to said unit to effect rapid heating thereof, windable timing means for operating said current-increasing means for a time interval, manual means for winding said timing means to different extents to cause said timing means to operate through any one of a plurality of time intervals of different length corresponding to different temperature levels, to thereby effect rapid heating of said unit to a selected temperature level corresponding substantially to a temperature level selected by said first-mentioned manual means, and thermal-responsive means for preventing winding of said timing means whenever said unit is already heated substantially to said selected temperature level.

16. In an electrical cooking apparatus, an electric cooking unit, means for energizing said unit, manually-adjustable means for operating said unit at any one of a plurality of temperature levels, means for greatly increasing the energizing current to said unit to effect rapid heating thereof, an operating member for said current-increasing means movable in opposite directions, manual means for moving said member in one direction to initiate operation of said current-increasing means, a timing device for moving said member in the other direction to interrupt the operation of said current-increasing means after a time interval, and temperature-indicia means associated with said last-mentioned manual means to enable manual movement of said member to different extents determined by said indicia means, thereby varying the range of movement of said member to vary the period of operation of said current-increasing means, whereby said unit may be rapidly heated to a selected one of a plurality of temperature levels corresponding substantially to a temperature level selected by said first-mentioned manual means.

17. In an electrical cooking apparatus, an electrical heating unit, means for energizing said unit, means for increasing the energization of said unit to above normal, to cause said unit to heat rapidly, timing means for controlling the period of abnormal energization of said unit, manually operable means for conditioning said timing means for operation, and thermal-responsive means for controlling the conditioning of said timing means according to the temperature condition of said unit, and for preventing unwarranted over-energization of said unit by operation of said timing means.

18. In electrical cooking apparatus, an electrical heating unit, means for energizing said unit, means including a normally open switch for increasing the energization of said unit to above normal, to thereby cause said unit to heat rapidly, a timing device, manually-operable means for initiating operation of said timing device and for simultaneously closing said switch, means operable by said timing device to open said switch after a time interval, to thereby restore normal energization of said unit, and thermal responsive means for controlling the operation of said timing device according to the temperature condition of said unit, and for preventing unwarranted over-energization of said unit by operation of said manual means.

19. In electrical cooking apparatus, an electrical heating unit, means for energizing said unit, means including a normally open switch for increasing the energization of said unit to above normal, to thereby cause said unit to heat rapidly, a spring-operated motor, manually-operable means for winding said motor to initiate operation thereof and for simultaneously closing said switch, means operable by said motor to open said switch at the termination of operation of the motor, and thermal-responsive means for governing the degree to which said motor may be wound according to the temperature condition of said unit, and for preventing unwarranted over-energization of said unit by operation of said manual means.

20. In electrical cooking apparatus, an electrical heating unit, means for energizing said unit, means including a normally open switch for increasing the energization of said unit to above normal, to thereby cause said unit to heat rapidly, a spring-operated motor remote from said unit, manually-operable means for winding said motor to initiate operation thereof and for simultaneously closing said switch, means operable by said motor to open said switch at the termination of operation of the motor, means including a thermal responsive element operatively associated with said motor for governing the degree to which said motor may be wound, and for preventing unwarranted over-energization of said unit by operation of said manual means, and a heater element in circuit with said unit and arranged cooperatively with said thermal responsive element.

21. In electrical cooking apparatus, an electrical heating unit, means for energizing said unit, means including a normally open switch for increasing the energization of said unit to above normal, to thereby cause said unit to heat rapidly, a spring-operated motor remote from said unit, manually-operable means for winding said motor to initiate operation thereof and for simultaneously closing said switch, means operable by said motor to open said switch at the termination of operation of the motor, an eccentric ratchet wheel operatively connected to said motor, a thermal responsive pawl element arranged cooperatively with said ratchet wheel for governing the degree to which said motor may be wound, and for preventing unwarranted over-energization of said unit by operation of said manual means, and a heater element in circuit with said unit and arranged cooperatively with said thermal responsive element.

22. In an electrical cooking apparatus, an electrical heating unit, means for energizing said unit, means for increasing the energization of said unit to above normal, to cause said unit to heat rapidly, manual means for operating said energy-increasing means, means for preventing abnormal energization of said unit until said manual means is released, and means for controlling the period of abnormal energization of said unit.

JOSEPH W. MYERS.